United States Patent
Krum

(10) Patent No.: US 6,244,219 B1
(45) Date of Patent: Jun. 12, 2001

(54) SALTWATER MIXING TANK AND AQUARIUM ENVIRONMENTAL CONTROL SYSTEM

(76) Inventor: John S. Krum, 251 Bee Branch Rd., Leicester, NC (US) 28748

( * ) Notice: Subject to any disclaimer, the term of this patent is extended or adjusted under 35 U.S.C. 154(b) by 0 days.

(21) Appl. No.: 09/472,515

(22) Filed: Dec. 27, 1999

(51) Int. Cl.[7] .......................... A01K 63/00; A01K 63/04
(52) U.S. Cl. .................. 119/245; 119/248; 119/268; 119/231
(58) Field of Search .................... 119/231, 245, 119/246, 247, 248, 268; 210/150, 169

(56) References Cited

U.S. PATENT DOCUMENTS

| | | | |
|---|---|---|---|
| 3,683,855 | * 8/1972 | Levitov | 119/268 |
| 3,971,338 | 7/1976 | Alexson | 119/262 |
| 4,773,008 | * 9/1988 | Schroeder et al. | 119/245 |
| 5,096,576 | 3/1992 | Szabo | 210/150 |
| 5,097,795 | 3/1992 | Adey | 119/262 |
| 5,306,421 | 4/1994 | Weinstein | 119/248 |
| 5,433,843 | 7/1995 | Calabrese | 119/259 |
| 5,469,810 | * 11/1995 | Chiang | 119/248 |
| 5,485,808 | * 1/1996 | Huebner | 119/231 |
| 5,560,318 | * 10/1996 | Yoshida et al. | 119/248 |
| 5,755,961 | 5/1998 | Limcaco | 119/260 |
| 5,881,753 | 3/1999 | Bowling | 137/1 |

* cited by examiner

Primary Examiner—Charles T. Jordan
Assistant Examiner—Elizabeth Shaw
(74) Attorney, Agent, or Firm—Richard C. Litman

(57) ABSTRACT

A saltwater aquarium environmental control system contains a salt mixing tank and has a specific gravity float switch to maintain proper salinity in the mixing tank so that a ready supply of fresh saltwater is available for replenishing water in the aquarium tank. The system may contain a second specific gravity float switch to monitor the saline concentration in the aquarium tank. The system provides for mixing replenishment saltwater, for automatically dispensing replenishment saltwater at timed intervals in predetermined volumes, and for monitoring and adjusting proper salinity in a saltwater aquarium. A routine exchange of saltwater into and out of the aquarium tank is maintained in order to maintain clean, fresh saltwater in the aquarium tank at all times.

20 Claims, 6 Drawing Sheets

SALTWATER MIXING TANK AND AQUARIUM ENVIRONMENTAL CONTROL SYSTEM

BACKGROUND OF THE INVENTION

1. Field of the Invention

The present invention relates to a saltwater mixing tank and aquarium environmental control system which utilizes at least one specific gravity float to maintain the proper saline level in an aquarium system in order to keep marine plants and animals thriving. The system provides for the mixing, dispensing and monitoring of proper salinity in a saltwater aquarium system.

2. Description of the Related Art

Saltwater aquariums are very difficult to maintain. Marine organisms do not adapt well to changes in their environment. This is because of the stability of the physical and chemical characteristics of the ocean environment over time. There is a need to maintain a constant environment in a saltwater aquarium. When the environment fluctuates too much, the marine organisms will die. Aquarium systems have been the subject of numerous patents and are well known in the prior art; however, none of the prior art utilizes the apparatus of the present system nor are they as efficient as the current invention.

Every saltwater hobbyist recognizes the necessity of regular water changes. It is recommended that 20% of the volume of a saltwater aquarium be exchanged every month. Typically, this change is done all at once with the salts being mixed in a bucket and allowed to sit overnight. Sometimes the mixed solution is not allowed to sit overnight and the inadequately mixed solution is poured into the aquarium. The act of pouring the water into the aquarium results in the stirring up of the marine organisms, the gravel and undissolved particles into the resulting solution. This method of adding saltwater to an aquarium results in a drastic change in pH, temperature, salinity, the concentration and type of dissolved and undissolved organics, and many other environmental changes which add incredible stress to the fish. It is widely recognized that this is one of the major contributors to fish mortality in an aquarium. If the water changes were to occur more gradually, as they do in nature (slowly and on a continual basis), a stable and successful aquarium could be maintained.

Most saltwater aquarium accessories currently available emphasize filtration devices to clean the water and remove impurities. Consequently, filtration systems are well known in the prior art. U.S. Pat. No. 5,306,421 discloses an internally-situated filtration system for a saltwater tank. U.S. Pat. No. 3,971,338 describes an aquarium apparatus designed to make an aquarium system self contained by having a sub-gravel filter in series with a carbon filter, an ultraviolet sterilizer, a temperature control unit, and a water withdraw and return that maintains circular flow in the tank. U.S. Pat. No. 5,096,576 shows an aquarium water filter system which can be utilized for both fresh and saltwater aquariums; the filter system utilizes gravity to control the water return rate, and has both mechanical and biological filtration prior to the return of the water to the aquarium. The inadequacy found in filtration devices is that they are incapable of removing all of the impurities, some of which are unremovable byproducts of metabolism that tends to significantly decrease the fish's resistance to disease. No provision is made in these patents for the maintenance of proper salinity in a saltwater aquarium environment.

U.S. Pat. No. 5,097,795 issued to Adey on Mar. 24, 1992 describes a water purification system which creates an integrated, small-scale marine or fresh water ecosystem suitable for use in a small scale aquarium. The invention of Adey utilizes a movable algal turf (a scrubber) to remove, from the aquarium water, suspended organic particulates, carbon dioxide, dissolved nutrients and other pollutants. In effect, the scrubber uses algal photosynthesis fueled by lights above the receptacle to promote metabolic cellular-ambient water exchange. Additional components of the ecosystem may be provided, including salinity controllers. The salinity controller disclosed in Adey is merely a means to maintain a constant level of water in the tank thus avoiding too high a concentration of salt. The invention of Adey does not provide for a balanced salinity concentration; there is no mechanism for monitoring the specific gravity of the water.

U.S. Pat. No. 5,433,843 issued to Calabrese on Jul. 18, 1995 discloses a marine aquarium or holding system that has a tank connected to a closed loop circulation system which communicates with an open loop through an osmotic and hydrostatic pressure exchange. A dialysis apparatus is placed into the closed loop and the open loop system for removing undesirable elements. A separate holding tank for dialysate solution is provided in the open loop system. Filters and pumps are provided for removing unwanted particles and chemicals, and for simultaneous dispensing of a dialysate and a contaminated solution on opposite sides of a semi-permeable membrane. The open loop system is connected with a freshwater source. Float switches, solenoids, and other components are included and connected in such a way to automatically remove waste products from the closed water loop system. Post dialysis water may be reconstituted with trace elements inadvertently removed by the dialysis process. Although the invention of Calabrese provides a means for equilibrating salt concentration between the contaminated solution and the dialysate solution, it does not provide a direct measure of salinity nor does it provide a means for correcting too high a concentration of salt in the water.

U.S. Pat. No. 5,755,961 issued to Limcaco on May 26, 1998 discloses a fluid treatment device for an aquarium designed to model a natural, healthy ecosystem. It shows a water treatment device and system that includes an inlet reservoir, an aquarium tank in fluid communication with the inlet reservoir to receive water displaced therefrom, an outlet reservoir in fluid communication with the tank for receiving water displaced therefrom, and a water treatment unit in fluid communication with both reservoirs. The water treatment unit is a rotatable support media wheel and can include a biological filter media for supporting bacterial growth and/or a screen attached to support algal growth, Air capturing devices may be included. The invention of Limcaco is designed to support natural-type ecosystems by controlling pH, oxygen, carbon dioxide concentration, nutrient availability and waste removal. The invention of Limcaco is silent about saltwater concentration and makes no provisions for the maintenance of proper salinity in the saltwater aquarium environment.

Many devices are available to automatically add fluid to an aquarium in order to maintain the proper fluid level. Some devices automatically pump water into an aquarium at a predetermined, manually set, time and/or rate which can lead to either overfilling or under filling of the aquarium. Other devices utilize a fluid level sensor of some sort to activate a pump once the water level drops below a certain point, and the fluid level sensor shuts off the pump once a predetermined water level has been obtained. Float valves and float switches are commonly used as fluid level sensors.

U.S. Pat. No. 5,881,753 issued to Bowling on Mar. 16, 1999 describes a passive fluid level controller which replaces fluid lost from a container maintaining the fluid level therein. The passive fluid level controller may be utilized with an aquarium in order to prevent the lowering of water level. The system uses air pressure to replace fluid lost from a container such as an aquarium. Neither the invention of Bowling nor the other prior art devices used to control water level provide a means to control the water level and to monitor the salinity concentration.

None of the above inventions and patents, taken either singularly or in combination, is seen to describe the instant invention as claimed. Thus, a saltwater mixer and aquarium environmental control system solving the aforementioned problems is desired.

SUMMARY OF THE INVENTION

The primary goal of successful saltwater aquarium maintenance is to balance the environment and strictly limit the variance. Nature's way of maintaining a livable environment on the pristine ocean reefs is the constant up-welling of fresh currents of salt water from the vast reservoirs of the ocean depths. My invention focuses on constantly changing the water with fresh saltwater. This system flushes out all of the contaminants and reduces the need for certain expensive filtration devices.

The present invention is a saltwater aquarium environmental control system which utilizes at least one specific gravity float to maintain the proper saline level in an aquarium system in order to keep marine plants and animals thriving. The system provides for the mixing, dispensing and monitoring of proper salinity in a saltwater aquarium.

Evaporation increases the concentration of salt in the water while the addition of fresh water dilutes the concentration of salt in the aquarium water. While it is difficult to maintain the proper water salinity in an aquarium environment, it is essential for the health and life of marine organisms for the proper salinity to be maintained.

Accordingly, it is a principal object of the invention to increase the life expectancy of marine organisms by limiting fluctuations in their environment. The present invention limits fluctuations in the aquarium environment by monitoring the salinity of the water and decreasing the salinity as required. The present invention monitors both the salinity of the water and the level of the water in the mixing tank. Alternate embodiments of the present invention also monitor the water level in the aquarium.

It is another object of the invention to provide a convenient and easily maintained system for the exchange of fresh saltwater into a saltwater aquarium. My invention exchanges the water in the aquarium on a continual, gradual basis thus assuring that clean, fresh saltwater is in the aquarium at all times.

It is a further object of the invention to provide a means for measuring the concentration of salt in the saltwater aquarium thus preventing too high a concentration due to evaporation. The current invention constantly monitors the saline content of the aquarium's saltwater thus assuring a steady state concentration at all times.

Still, another object of the invention is to limit the additional costs of maintaining a saltwater aquarium by reducing the need for expensive filtering equipment. My invention does not require elaborate filtering systems since the old saltwater is constantly replaced with fresh saltwater.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is a saltwater mixing tank and aquarium environmental control system which is designed to exchange used saltwater for fresh saltwater in a steady, constant manner and to maintain the saline concentration in the saltwater of the aquarium at an ideal level. There are multiple potential embodiments of the present invention depending on the aquarium system setup in use. Three embodiments are discussed herein. Each of these embodiments has features which could be utilized in the other embodiments. The current invention is designed to be utilized with already established saltwater aquariums as well as with newly set up systems. By placing the mixing tank in line with the fresh water inlet to the established aquarium, an aquarium environmental control system may be set up according to the invention herein. The potential specific embodiments are therefore very diverse.

Figure 1:
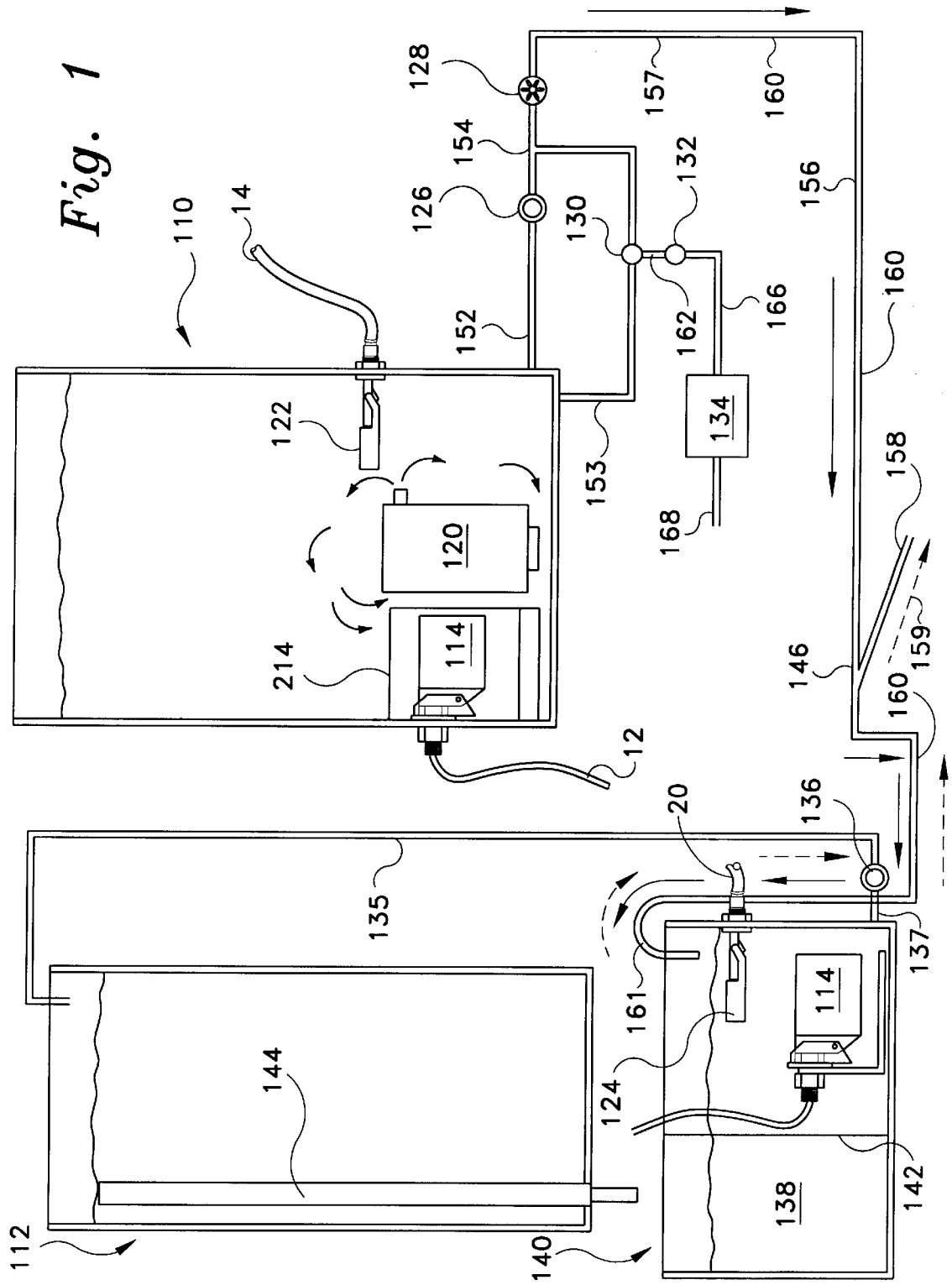
FIG. 1 is a schematic view of a saltwater aquarium environmental control system, according to one embodiment of the present invention, that is used with aquariums having an external sump, and includes a salt mixing pump and a fresh water inlet directly connected to an external water supply.

The first preferred embodiment of the present invention is depicted in FIG. 1. This embodiment of the saltwater aquarium environmental control system is for use with aquariums having an overflow pipe 144 or internal partition that maintains a certain water level in the aquarium 112, and overflows to an external sump tank 140 which usually contains a conventional filtration media 138, a trickle or wet-dry filter 142 and a holding area for filtered saltwater. A water recirculation pump 136 supplies the aquarium 112 with filtered water from the sump tank 140 via aquarium inlet line 135, the overflow tube maintaining the water level in the aquarium 112 at a constant level.

In this embodiment of the aquarium system, the system adds fresh saltwater to the aquarium at timed intervals from a salt water mixing tank 110, or adds fresh, unsalinated water to the aquarium 112 from a fresh water inlet 168 directly connected to an external water supply when the salt level in the aquarium 112 rises too high, as determined by monitoring the specific gravity of the water in the sump tank 140.

A specific gravity float switch 114 is in the sump tank 140 holding area and is used to measure the specific gravity of the saltwater in the sump tank 140, and therefore in the aquarium 112 as well. The saline concentration of the saltwater in the sump tank 140, as well as the saline concentration in the aquarium 112, is susceptible to change because, viz., evaporation increases the concentration of the saltwater. The specific gravity float switch 114 is electrically connected to a controller 400 to supply fresh water to the sump tank 140, and hence the aquarium 112, to decrease the saline concentration as described infra.

In order to monitor the water level in the sump tank 140, a high water level float switch 124 is provided which monitors the level of water in the sump tank 140. The high water level float switch 124 is connected to a controller 400 via wires 20 and serves to prevent overflow by shutting off the water exchange pump 126 or the water solenoid 132. The aquarium 112 and sump pump 140 are a semi-closed system serving to recirculate the filtered water.

Both fresh water and salt water are supplied to the sump tank 140 by a water supply line 157. The water supply line 157 has a drainage line 158 branching off the line 157 to define a Y-shaped junction 146. The supply line 157 terminates in a substantially U-shaped siphon 161 having an open end which extends into the sump tank 140. The open end of the siphon 161 may have a screen to prevent the supply line 157 from becoming clogged with food or debris from the sump tank 140. When either fresh unsalinated water or fresh salt water is being supplied to the sump 140, the direction of fluid flow is indicated by the solid arrows 155 in FIG. 1. The supply line may be viewed as having an upstream line 156 between a vane-type flow meter 128, such as the Rotor Flow made by Gem Sensors, Imo Industries, Inc. of Plainville, Conn., and the Y-shaped junction 146, and a downstream line 160 between the Y-shaped junction and the U-shaped siphon 161. It will be noted that the drainage line 158 branches off the supply line 157 at an acute angle and slopes vertically downward in a direction opposite to the flow of water through the supply line when the sump tank 140 is being filled.

As fresh water or salt water is pumped towards the sump tank 140, the velocity of the fluid flow through the Y-shaped junction 146 is fast enough that the lateral pressure at the drainage line drops and a vacuum is created in the drainage line 158 as air is pulled through the drainage line 158 in the direction 155 of fluid flow. This is a manifestation of the venturi effect, sometimes referred to as Bernouli's principle, and is similar to the phenomenon observed in a water aspirator used to provide vacuum for a filter flask, in that a vacuum is created in the side tube by the rapid passage of water through the main tube. As the sump tank 140 fills, the water level rises above the opening in the siphon 161. After filling, pressure in the supply line drops, causing excess water in the sump tank 140 to siphon back through the downstream portion 160 of the supply line 157 in the direction of the dashed line 159 and out through the drainage line 158 to a drain or wastewater tank until the water level in the sump tank 140 drops below the level of the open end of the U-shaped siphon 161.

The Rotor Flow flow meter 128, or an analogous flow meter, has a pulsed output proportional to the fluid flow which can be read directly off the indicator 128 or fed directly to the controller 400 and used to gauge the volume of fluid being replenished. A certain preset amount of fresh salt water is added to the aquarium two or three times per day. The reading of the flow meter 128 is used to determine the preset amount and to program the controller 400, FIG. 5, to turn on and off the water exchange pump 126 at the proper time and interval so as to maintain a steady influx of fresh saltwater in the sump tank 140 and consequently in the aquarium tank 112. Each time water is added to the sump tank 140, the water level in the sump tank 140 rises to above the output level of the siphon "U" 161. This excess water is siphoned back via the siphon "U" 161 down through the base line 160 of the venturi "y" 146 and into the drainage line 158 of the "y" 146. If the water level rises to the level of the float switch 124 before the controller 400 has finished adding water, the water flow is interrupted by the controller for a preset period of time until the excess can be siphoned off and then the water flow resumes.

In the event that a drain is not readily available, a wastewater tank can be used. The wastewater tank (not shown) typically consists of a tank with a float switch to mark the high-level cut off. The high level cut off float switch communicates with the controller and cuts off the pumps. An empty waste indicator light 446 may be utilized on the controller 400 to inform the aquarium keeper of the need to empty the waste water.

The flow meter 128 is attached to an arm of a T-shaped line 154. One of the arms of the T-shaped line 154 is connected to a water exchange pump 126 which is then connected via a mixing tank outlet line 152 to the mixing tank 110; the freshly mixed saltwater flows out of the mixing tank outlet line 152. The remaining arm of the T-shaped line 154 is connected to a 2-way solenoid valve 130 which is connected to a mixing tank inlet line 153 that is connected to the mixing tank 110; the fresh water flows into the mixing tank 110 through the mixing tank inlet line 153. The 2-way solenoid and the water pump are essentially in parallel arrangement to one another. The 2-way solenoid valve 130 is connected to line 162 which is in turn connected to a water solenoid 132. The water solenoid 132 is utilized to permit fresh water to flow into the tubing circuit and therefore reduce the specific gravity of the solution. The water solenoid 132 is connected via line 166 to a filtration device 134 and a household plumbing inlet 148. The water solenoid 132 prevents fresh water from being introduced into the system when unnecessary. The 2-way solenoid valve directs the fresh water to the mixing tank 110 or to the aquarium 112 as needed.

The mixing tank 110 is a tank which is utilized to mix salt into the fresh water or low salt concentrated saltwater and to hold the mixed saltwater until needed. The mixing tank, as shown in FIG. 1, has a salt mixing pump 120 and a specific gravity float switch 114. Also, a low level cutoff switch 122 is included in the mixing tank 110. The low level cutoff switch 122 is connected to the controller 400 via wiring 14 and has the effect of shutting off the water exchange pump 126 so that the mixing tank 110 will not be pumped dry. If the level drops too low, an add salt indicator light 414 is illuminated, indicating that the aquarium keeper should add salt to the mixing tank 110, and putting the controller 400 in standby until more salt can be added to the mixing tank 110. Likewise, the specific gravity float switch 114 has wires 12 in communication with the controller and is used to indicate when more fresh water needs to be added to the mixing tank 110, either after the addition of salt to mix up another batch of saltwater, or due to evaporation. A baffle 214 is provided to prevent the water turbulence in the mixing tank 110 from disturbing the specific gravity float switch 114 contained therein.

Alternatively to an aquarium having a sump tank, an aquarium tank having a partition may be used with the contents of the sump tank held in the partition area and otherwise the same functions having a filter system, a specific gravity float and a high-level float switch. Additionally, This aquarium arrangement could be utilized with either, or both, a fresh water tank 170 as shown in FIG. 2, discussed below, and a conventional wastewater tank having a high-water level cut off switch (not shown).

Figure 2:
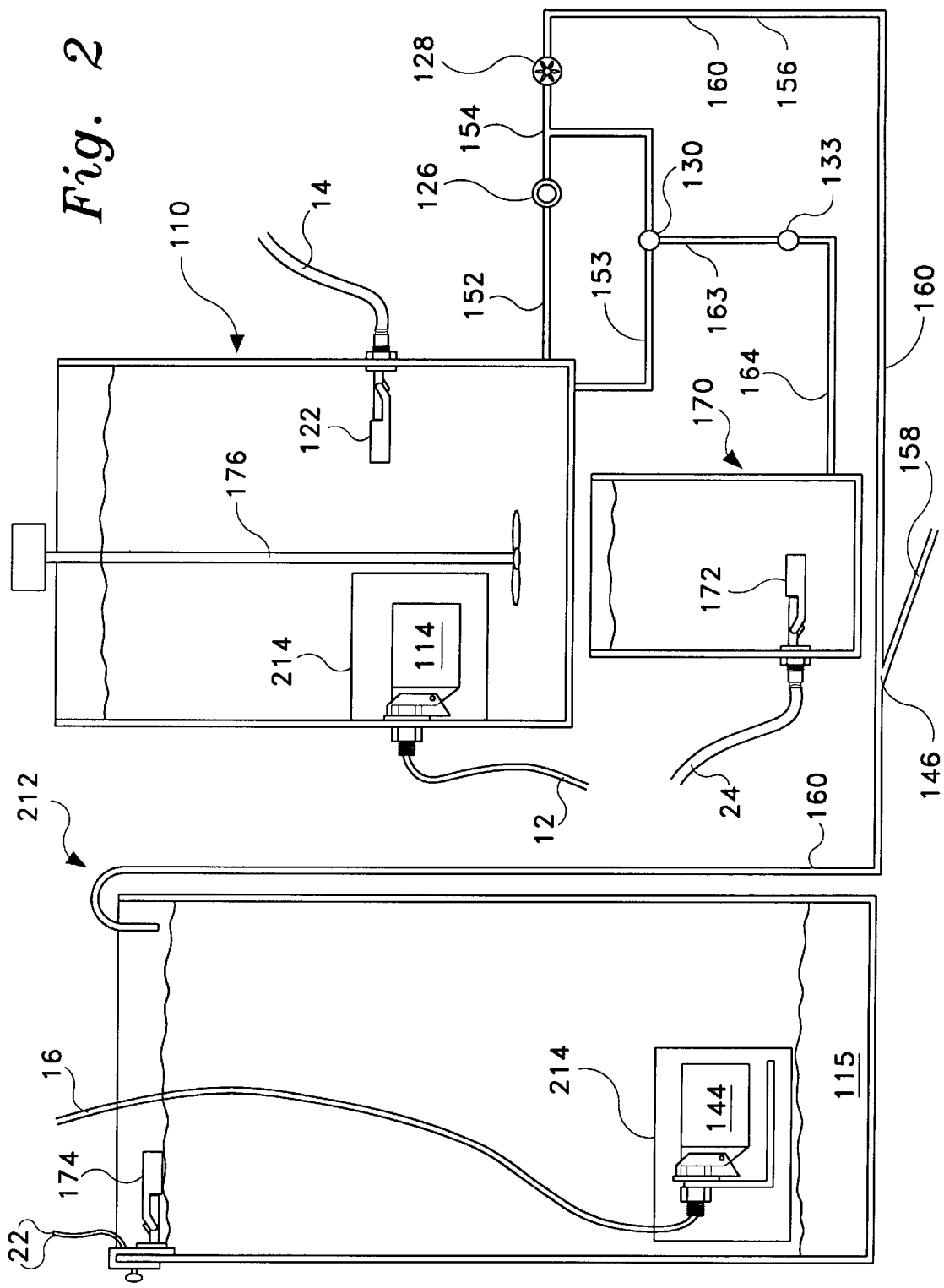
FIG. 2 is another embodiment of a saltwater aquarium environmental control system according to the present invention, which is used with aquariums having a paddle type mixer, and a fresh water inlet connected to a fresh water reservoir.

FIG. 2 depicts the second embodiment of the present invention. The second embodiment differs from the first embodiment because it utilizes an aquarium tank 212 which does not have a sump tank or a partition, and it utilizes a freshwater tank 170 instead of a direct freshwater plumbing connection. Either of these could be exchanged with the other. In other words, the freshwater tank could be utilized with an aquarium having a partition or a sump tank, and/or the freshwater inlet could be connected directly to plumbing.

The aquarium tank 212 utilized in the second embodiment has a high water level float switch 174 which is connected to the controller, via wires 22, and the high water level float serves to monitor the level of the water in order to prevent overflow. The aquarium tank 212 also has a specific gravity float switch 114 directly inserted therein and sitting on the gravel 115 or floor of the aquarium. The specific gravity float switch 114 contained in the mixing tank 110 and, possibly, the aquarium tank 212 may have a baffle 214 covering it. The baffle which covers the specific gravity float switch 114 serves to protect the specific gravity float switch 114 and prevent false opening or closing of the switch. The specific gravity float switch 114 has wires connected thereto in order to communicate with the controller and indicate that more freshwater is needed. It is essential that the mixing tank 110 contain a baffle 214 protecting the specific gravity float switch 114 from turbulence during mixing. The baffle 214 shown protecting the specific gravity float switch 114 in the aquarium 212 is optional.

A supply line 159 delivers water from the salt water mixing tank 110 to the aquarium 212 in the same manner as the supply line 159 shown in FIG. 1, except that the open end of the siphon 161 extends over the aquarium 212 instead of a sump tank, and therefore will not be described further.

The flow meter 128 is attached to an arm of a T-shaped line 154. One of the arms of the T-shaped line 154 is connected to a water exchange pump 126 which is then connected via a mixing tank outlet line 152 to a mixing tank 110. The remaining arm of the T-shaped line 154 is connected to a 2-way solenoid valve 130 which is connected to a mixing tank inlet line 153 that is connected to the mixing tank 110. The 2-way solenoid and the water pump are essentially in parallel arrangement to one another. The 2-way solenoid valve 130 is connected to line 163 which is in turn connected to a fresh water pump 133. The fresh water pump is utilized to pump fresh water into the tubing circuit and therefore reduce the specific gravity of the solution. The fresh water pump 133 is connected via a fresh water holding tank line 164 to a freshwater holding tank 170. The freshwater tank 170 has a low fluid level float switch 172 connected via wires 24 to an indicator light 448 on the controller 400 and serves to inform the aquarium keeper to replenish the freshwater tank 170. The 2-way solenoid valve directs the fresh water to the mixing tank 110 or to the sump tank 140 as needed.

The mixing tank 110 is a tank which is utilized to mix salt into the fresh water or low salt concentrated saltwater and to hold the mixed saltwater until needed. The mixing tank 110, in FIG. 2, has a motor paddle type mixer 176 and a specific gravity float switch 114. Also, a low level cutoff switch 122 is included in the mixing tank 110. The low level cutoff switch 122 is connected to the controller 400 via wiring 14 and has the effect of shutting off the water exchange pump 126 so that the mixing tank will not be pumped dry, lighting an add saltwater indicator light 414, indicating to the aquarium keeper to add salt to the mixing tank 110, and putting the controller 400 in standby until more salt can be added to the mixing tank 110. Likewise, the specific gravity float switch 114 has wires 12 in communication with the controller 400 and is used to indicate when more fresh water needs to be added to the mixing tank either after the addition of salt to mix up another batch or due to evaporation.

Figure 3:
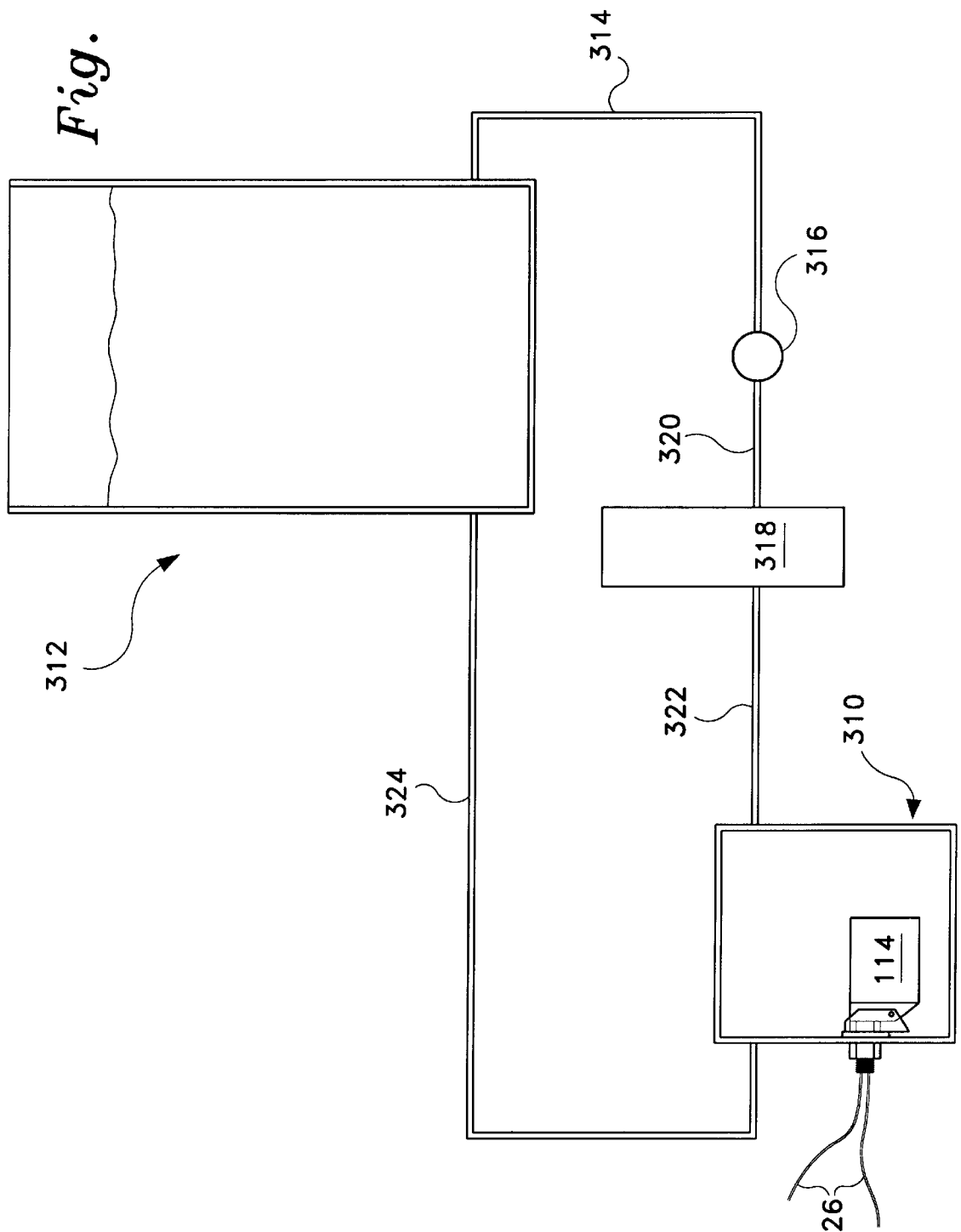
FIG. 3 is still another embodiment of a saltwater aquarium environmental control system, according to the present invention, wherein the specific gravity float switch is placed inside a container which is in-line with the aquarium plumbing.

The third embodiment, depicted in FIG. 3, demonstrates that the specific gravity float switch 114 may be placed inside a closed container 310 in-line with the aquarium tank's 312 plumbing. The aquarium tank 312 of this embodiment has an inlet line 324 and an outlet line 314. The outlet line 314 is connected to a recirculation pump 316 which is in turn connected to another line 320. The line 320 is connected to a filtering device 318 which is connected to yet another line 322 which leads to the closed container 310. The closed container 310 is then connected to the inlet line 324. The saltwater of the aquarium system is circulated by the pump 316 through the filtering device 318 through the closed container and back into the aquarium tank 312. The specific gravity float switch 114 inside the closed container 310 communicates with the controller 400 through its wiring 26 and controls the addition of water to the aquarium system. The aquarium tank 312 may be utilized with a mixing tank 110 in the manner stated previously.

All lines referred to herein are standard tubes used in aquariums for fluid communication between the different parts of the system. They are cut to fit the particular distance required by the unique individual setup of the aquarium system. The lines are all the same and interchangeable depending on the particular length required, except for the venturi "y", the siphon "U" and the T shaped line. All of these lines are conventional.

Figure 4A:
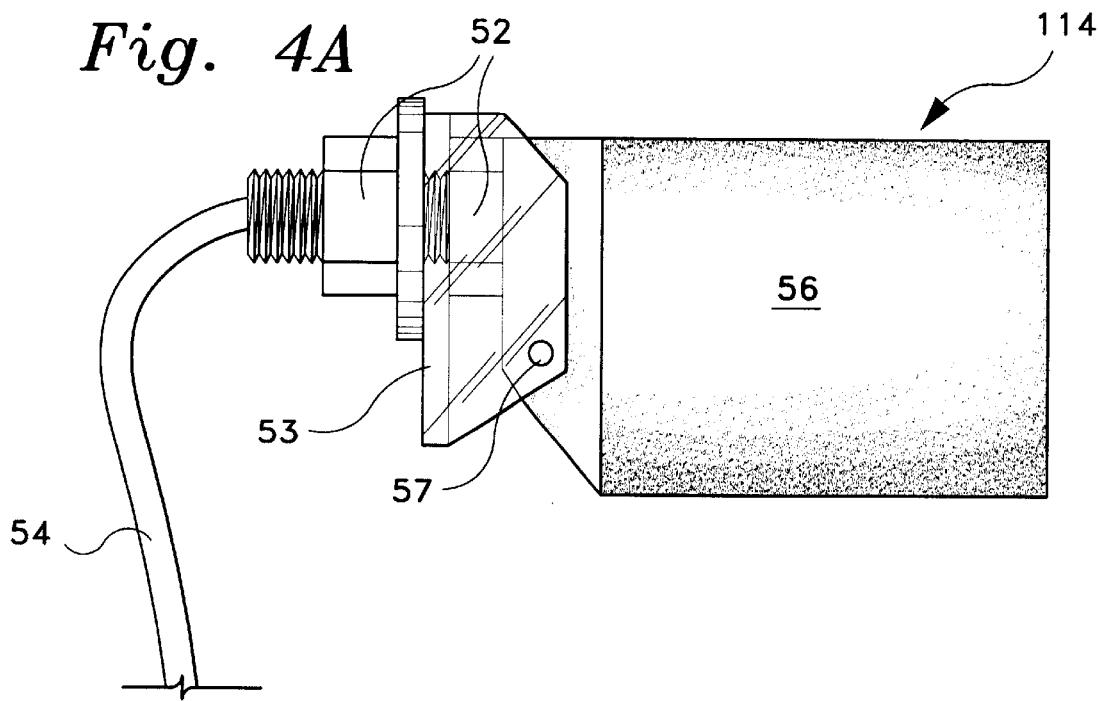
FIG. 4A is a side view of a specific gravity float switch, according to the present invention, in the closed position.
Figure 4B:
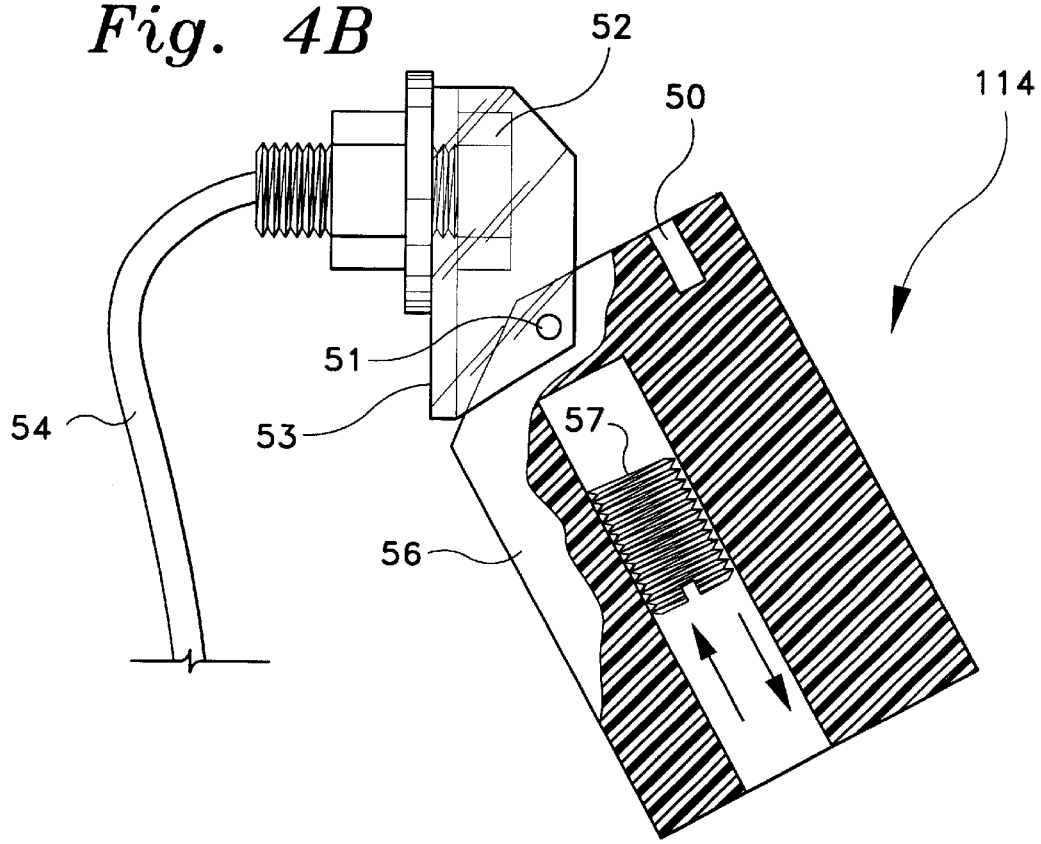
FIG. 4B is a cut away side view of a specific gravity float switch showing a magnet which operates the switch and a movable counter balance, according to the present invention, in the open position.

FIGS. 4A and 4B show the specific gravity float switch 114 used throughout the different embodiments of the present invention. FIG. 4A depicts the specific gravity float switch 114 in the closed position. This position indicates that the saline concentration in the saltwater is too high and that there is need to decrease the concentration of salt therein by the addition of fresh water. FIG. 4B depicts the open position which indicates that the saline concentration is at or below the desired level.

FIG. 4B also shows the internal mechanisms of the specific gravity float switch 114. The float switch 114 has a reed switch 52 mounted on a flat plate 53 having a pair of side flanges, which may be made from transparent polycarbonate. The float 56 may be made from an extruded polypropylene rod and has a cylindrical threaded bore defined therein. The float 56 has one end pivotally mounted to the flanges of the flat plate 53 by a pivot pin and has a magnet 50 mounted therein so that when the end of the float rod 56 pivots against the flat plate 53, the magnetic field of the magnet 50 causes the reed switch 52 contacts to close. The float 56 includes a cylindrical threaded counterweight 57 having a slot defined across one end disposed in the bore.

The flat plate 53 is normally mounted in the mixing tank 110, and in the sump tank, if so equipped, with the plate 53 aligned vertically, the counterweight 57 causing the float 56 to pivot downward in the open position, as shown in FIG. 4B. As the saline concentration rises, the increased density of the water causes the float 56 to become buoyant, raising the float 56 and causing it to pivot about the pin 51 to a horizontal position, as shown in FIG. 4A. The magnetic field of the magnet 50 causes the reed switch 52 contacts to close, signalling the controller 400 through wires 54 to add fresh unsalinated water to the system. As water is added, the density of the tank water decreases, causing the float 56 to become less buoyant and to pivot downward, opening the float switch 114 to stop the flow of fresh water into the tank.

The average specific gravity of seawater is 1.020. The counterweight 57 is chosen such that it will typically be positioned in the center of the specific gravity float 56 at the specific gravity desired. This counterweight 57 is used to make the specific gravity float 56 buoyantly neutral when the saltwater solution has a specific gravity of 1.020. If a higher specific gravity is desired, the counterweight is moved outward away from the pivot point 51, increasing the moment arm, and therefore the torque applied by the counterweight. If a lower specific gravity is desired such is found in brackish water, the counterweight is moved inward towards the pivot point 51.

Figure 5:
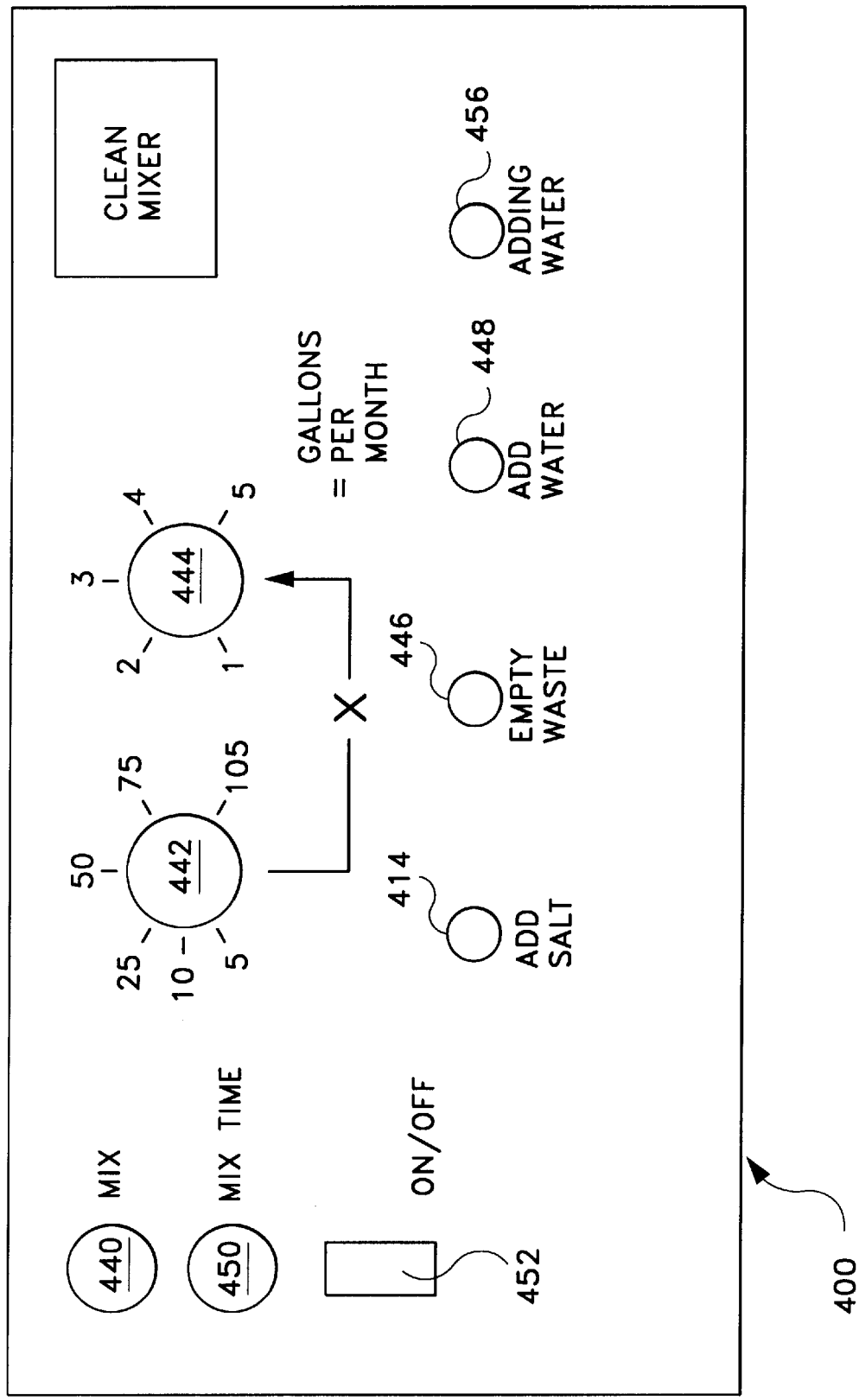
FIG. 5 is a front view of a control panel as used with an embodiment of the present invention.

FIG. 5 indicates a possible controller 400 for the aquarium system depicted herein. The face plate 440 of the controller is made of any standard material, including plastic, metal or wood. In the embodiments shown in FIGS. 1 and 2, as the solution lowers in the mixing tank 110, a low-level shut-off switch 122 (preferably the magnetic-reed type switch), connected to the controller via wiring 14, moves to the closed position and a low-salt-indicator-light 414 is illuminated indicating the need to add more salt. More salt is added (1 or 2 cups) and the mix button 440 on the controller 400 is pressed, thus starting the mixing pump 120 for a predetermined time (approximately 10 minutes). As specific gravity rises, the specific gravity float switch 114 in the mixing tank 110 rises and turns on the water solenoid 132 in FIG. 1, or the fresh water pump 133 in FIG. 2. Freshwater is added until the specific gravity float switch 114 falls and shuts off the water supply. The specific gravity float switch 114 communicates through the wires 12 to the controller 400. The adding water indicator light 456 goes on when water is being added to the mixing tank 110. Replenishment rates are set by the analog dials 444 and 442, or by a digital keypad (not shown), on the controller 400, for controlling the flow rate and time intervals for dispensing fresh salt water from the mixing tank 110 to the aquarium 112 (the flow rate may be controlled either by the flow meter 128 or a valve in water exchange pump 126). A certain preset amount of fresh salt water is added to the aquarium two or three times per day. The timing is determined by the readings taken from the Rotor Flow flow meter 128. If there is a drain tank and it fills, a high-level float switch disables the controller 400 and an empty waste light 446 indicates the need to empty the waste tank, if the system is equipped with a waste tank. A low fluid level float switch 172 on the freshwater tank 170, if there is one, indicates if the level has dropped too low, at which point an add water indicator light 448 will turn on showing the need to add more water. As can be seen from the previous discussion, an optional specific gravity meter can monitor specific gravity in the aquarium, in the sump tank or in a separate canister in line with external aquarium filtration.

Several relays may be added that will provide lockout protection: If solution is being mixed by the mixing pump, the freshwater pump or solenoid is locked out preventing the addition of freshwater to the mixing tank due to movement of the specific gravity switch while mixing. If fresh water is being added to mix tank, this locks out the water change pump preventing the addition of partially-mixed salt to the aquarium.

Figure 6:
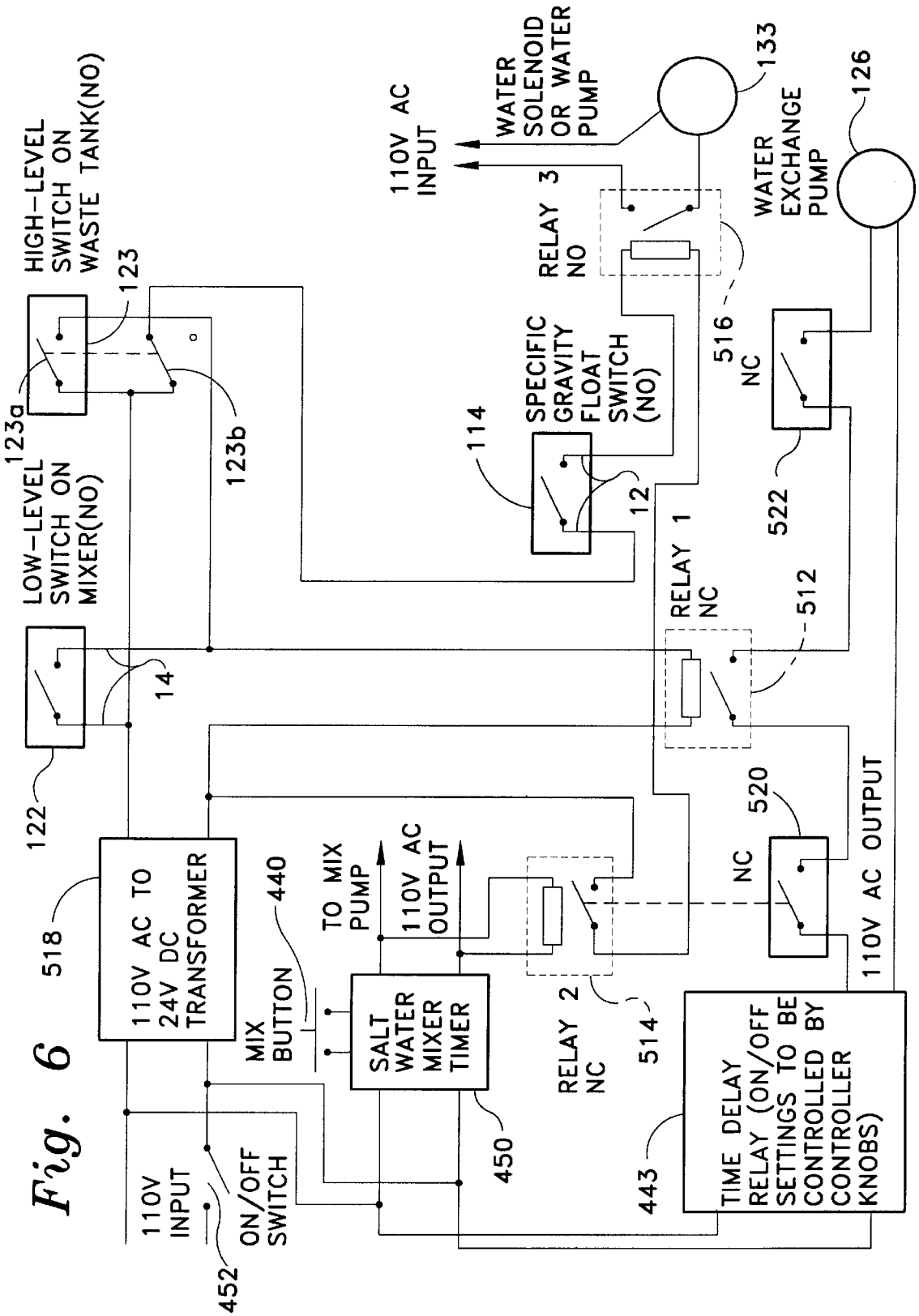
FIG. 6 is a schematic diagram of a control system used with the control panel of FIG. 5.

FIG. 6 shows an exemplary partial electrical schematic for the control of a mixing tank 110 and an aquarium system according to the present invention. The schematic shows three relays. "NO" denotes a normally open switch contacts and "NC" denotes normally closed switch contacts on the schematic. A conventional 110 volt power supply is applied through an on/off switch 452. The 110 voltage alternating current is transformed to 24 volts DC by the transformer 518.

The circuit applies the full 110V AC to a salt water mixer timer 450, which times the mixing of the saltwater in the mixing tank 110, and thence to the mixing pump 120. Power is applied for a timed interval when the mix button 440 is depressed. The circuit also applies the full 110V AC to a time delay relay 443, which times the release of saltwater from the mixing tank 110 by the water exchange pump 126, and thence to power the water exchange pump 126. Power is applied to the water exchange pump 126 automatically for a period adjustable by the control knobs 442 and 444.

The circuit includes three other control relays. The first relay, relay number one 512, disables the water exchange pump 126 in case of either a low level of water in the mixing tank 110 or a high level of water in the wastewater tank, if the system is equipped with a wastewater tank. If either the low-level switch 122 on the mixing tank or the first set of contacts 123a of high-level switch 123 on the waste tank are closed, 24VDC is applied to the coil of relay one 512, opening the relay contacts, which are normally closed, in order to prevent power being applied to the water exchange pump 126. The first relay 512 serves to prevent the pumping of water through the system when there is an insufficient water level in the mixing tank 110 and therefore prevents pumping the mixing tank 110 dry. The first relay 512 also prevents overflowing of the wastewater tank when there is too much water in the wastewater tank.

The second relay, relay number two 514, disables the water solenoid 132 or the fresh water pump 133, and also the water exchange pump 126, when the saltwater mixing pump 120 is enabled. Relay two is a double pole, double throw relay, which both sets of contacts normally closed. When power is applied to the mixing pump 120, the coil of relay two 514 is energized, causing a first set of contacts to open, disabling the water solenoid or water pump 132 or 133, and simultaneously causing a second set of contacts 520 to open, thereby disabling the water exchange pump 126. It will be understood that although only water pump 133 is shown in the schematic in FIG. 6, water solenoid 132 may be substituted therefor if the system is so equipped. The second relay 514 serves to prevent the system from circulating either fresh unsalinated water or fresh saltwater when saltwater is being mixed in the mixing tank 110.

The third relay, relay number three 516, turns on the water solenoid 132 or the fresh water pump 133 when the specific gravity float switch 114 in the mixing tank 110 calls for the water solenoid 132 or the fresh water pump 133 to be turned on. This occurs only when the second set of contacts 123b of the waste tank high-level switch 123 is closed thus indicating that the water level in the waste tank is not too high. Likewise, this will only occur when the mixing pump 120 is not pumping. The third relay also disables the water exchange pump 126 when it is energized. Relay three 516 is also a double pole, double throw relay with one contact normally open and one contact normally closed. When the specific gravity float switch 114 closes, the coil of relay three 516 is energized, causing the normally open relay contacts to close in order to apply 110V AC to the water solenoid 132 or water pump 133, provided that the second set of contacts 123b of the high-level switch on the waste tank are in their normally closed position and provided that the contacts of relay two 514 are in their normally closed position.

It is to be understood that the present invention is not limited to the embodiments described above, but encompasses any and all embodiments within the scope of the following claims.

I claim:

1. A saltwater aquarium environmental control system for maintaining saltwater in a saltwater aquarium at a predetermined saline concentration, comprising:
  a) a mixing tank for mixing salt with fresh water;
  b) a mixing pump disposed in said mixing tank;
  c) a low water level float switch disposed in said mixing tank;
  d) a fluid supply line extending between said mixing tank and a tank of a saltwater aquarium, the supply line including a drainage line branching from the supply line at a Y-shaped junction;
  e) a water exchange pump disposed in said supply line; and
  f) an electronic controller, said mixing pump, said low water level float switch, and said water exchange pump being electrically connected to the controller;
wherein the controller electronically controls the mixing of fresh saltwater in said mixing tank and controls dispensing predetermined volumes of fresh saltwater from said mixing tank to the tank of the saltwater aquarium at predetermined times.

2. The saltwater aquarium environmental control system according to claim 1, wherein the drainage line branches off said supply line at an acute angle and slopes downward in a direction opposite to the flow of saltwater from said mixing tank to the tank of the saltwater aquarium.

3. The saltwater aquarium environmental control system according to claim 1, wherein said supply line terminates in a U-shaped siphon having an open end, the U-shaped siphon being disposed over an edge of the tank of the saltwater aquarium with the open end being disposed in the tank, the Y-shaped junction in said supply line being disposed below the level of said siphon, so that when a water level in the tank is above the open end of the siphon and when no pressure is applied to fluid upstream of the Y-shaped junction, water is siphoned from the tank through said supply line and out the drainage line until the water level is below the open end of the siphon.

4. The saltwater aquarium environmental control system according to claim 1, further comprising a specific gravity float switch disposed in said mixing tank for determining the specific gravity of saltwater in said mixing tank, the specific gravity float switch being electrically connected to said controller, said controller having electrical circuitry for adding fresh water to said mixing tank when the specific gravity exceeds a predetermined level.

5. The saltwater aquarium environmental control system according to claim 4, wherein said specific gravity float switch further comprises:
  a) a flat plate having a pair of opposed flanges, the fixed plate being mounted in a vertical plane within said mixing tank;
  b) a reed switch mounted on said flat plate, the reed switch being electrically connected to said controller and having a set of contacts;
  c) a cylindrical float having a threaded bore defined therein, the float being pivotally mounted to said flat plate by a pivot pin extending between said opposed flanges and extending transversely through an end of the float;
  d) a magnet mounted in the pivotally mounted end of the float, so that said float may pivot between an open position in which the reed switch contacts are open and a closed position in which the magnetic field of said magnet causes the reed switch contacts to close; and
  e) a threaded counterweight disposed in the bore defined in said float, the counterweight being axially moveable in said bore in order to adjust the specific gravity at which said float switch moves from the open position to the closed position.

6. The saltwater aquarium environmental control system according to claim 4, further comprising a baffle disposed in said mixing tank, said baffle being disposed about said specific gravity float switch.

7. The saltwater aquarium environmental control system according to claim 1, further comprising a flow meter disposed in said supply line between said water exchange pump and said Y-shaped junction, said flow meter for determining the volume of saltwater transferred from said mixing tank to the saltwater aquarium.

8. The saltwater aquarium environmental control system according to claim 1, further comprising:
  a) a freshwater inlet line adapted for attachment to a source of fresh water, the inlet line having a junction bifurcating the inlet line into a mixing tank inlet line connected to said mixing tank and a saltwater tank inlet line joining said supply line at a T-shaped junction between said water exchange pump and the Y-shaped junction of said supply line;
  b) a two-way solenoid valve electrically connected to said controller and disposed at the bifurcating junction in said inlet line, for diverting the flow of fresh water to said mixing tank when the valve is in a first position, and diverting the flow of fresh water to the tank of the saltwater aquarium when the valve is in a second position; and
  c) means for starting and stopping the flow of fresh water.

9. The saltwater aquarium environmental control system according to claim 8, wherein fresh water is supplied from a household water supply and said means for starting and stopping the flow of fresh water comprises a water solenoid disposed in said fresh water inlet line between the fresh water source and said two way solenoid valve, the solenoid being electrically connected to said controller.

10. The saltwater aquarium environmental control system according to claim 8, further comprising a fresh water tank connected to said inlet line and said means for starting and stopping the flow of fresh water comprises a water pump disposed in the inlet line between said fresh water tank and said two way solenoid valve, the water pump being electrically connected to said controller.

11. The saltwater aquarium environmental control system according to claim 1, further comprising a specific gravity float switch disposed in the tank of the saltwater aquarium for determining the specific gravity of saltwater in the tank, the specific gravity float switch being electrically connected to said controller, said controller having electrical circuitry for adding fresh water to said mixing tank when the specific gravity exceeds a predetermined level.

12. The saltwater aquarium environmental control system according to claim 11, wherein said specific gravity float switch further comprises:
   a) a flat plate having a pair of opposed flanges, the fixed plate being mounted in a vertical plane within the tank of the saltwater aquarium;
   b) a reed switch mounted on said flat plate, the reed switch being electrically connected to said controller and having a set of contacts;
   c) a cylindrical float having a threaded bore defined therein, the float being pivotally mounted to said flat plate by a pivot pin extending between said opposed flanges and extending transversely through an end of the float;
   d) a magnet mounted in the pivotally mounted end of the float, so that said float may pivot between an open position in which the reed switch contacts are open and a closed position in which the magnetic field of said magnet causes the reed switch contacts to close; and
   e) a threaded counterweight disposed in the bore defined in said float, the counterweight being axially moveable in said bore in order to adjust the specific gravity at which said float switch moves from the open position to the closed position.

13. The saltwater aquarium environmental control system according to claim 11, further comprising a baffle disposed in said mixing tank, said baffle being disposed about said specific gravity float switch.

14. The saltwater aquarium environmental control system according to claim 11, further comprising a high water level float switch adapted for attachment within the tank of said salt water aquarium system, the high water level float switch being electrically connected to said controller, the high water level float switch protecting the tank from overflow when the tank is being filled with fresh water to reduce the specific gravity of water in the tank.

15. The saltwater aquarium environmental control system according to claim 1, wherein said controller further comprises:
   a) a mix button electrically connected to said mixing pump for starting the pump; and
   b) a salt water mixer timer electrically connected to said mixing pump for stopping said mixing pump after a predetermined time interval.

16. The saltwater aquarium environmental control system according to claim 1, wherein said controller further comprises a time delay relay electrically connected to said water exchange pump for starting and stopping the flow of saltwater from said mixing tank to the tank of the saltwater aquarium at predetermined time intervals and in predetermined volumes.

17. The saltwater aquarium environmental control system according to claim 1, wherein said controller further comprises user adjustable means for setting the time interval and flow rate for dispensing saltwater from the mixing tank to the saltwater aquarium.

18. The saltwater aquarium environmental control system according to claim 1, wherein said user adjustable means comprises at least one analog dial.

19. The saltwater aquarium environmental control system according to claim 1, further comprising:
   a) a watertight closed container capable of holding water;
   b) a specific gravity float switch disposed within said closed container, the switch being electrically connected to said controller;
   c) a fluid circulation line having an inlet branch having a first end in fluid communication with said closed container and a second end adapted for attachment to the tank of the saltwater aquarium and having an outlet branch having a first end in fluid communication with said closed container and a second end adapted for attachment to the tank of the saltwater aquarium;
   d) a filter disposed in said circulation line; and
   e) a recirculation pump disposed in said circulation line for circulating water between the closed container and the tank of the saltwater aquarium, the specific gravity float switch monitoring the saline concentration of water in the aquarium tank.

20. A saltwater aquarium environmental control system for maintaining saltwater in a saltwater aquarium at a predetermined saline concentration, comprising:
   a) a mixing tank for mixing salt with fresh water;
   b) a mixing pump disposed in said mixing tank;
   c) a low water level float switch disposed in said mixing tank;
   d) a saltwater aquarium tank;
   e) a fluid supply line extending between said mixing tank and said aquarium tank, the supply line including a drainage line branching from the supply line at a Y-shaped junction;
   f) a water exchange pump disposed in said supply line; and
   g) an electronic controller, said mixing pump, said low water level float switch, and said water exchange pump being electrically connected to the controller;
wherein the controller electronically controls the mixing of fresh saltwater in said mixing tank and controls dispensing predetermined volumes of fresh saltwater from said mixing tank to said aquarium tank at predetermined times.

* * * * *